United States Patent [19]

Arosio

[11] Patent Number: 5,316,347
[45] Date of Patent: May 31, 1994

[54] QUICK-FITTING COUPLING FOR SIMULTANEOUSLY CONNECTING OR DISCONNECTING A PLURALITY OF COUPLINGS

[76] Inventor: Massimo Arosio, Via L. Da Vinci No. 1, Rivolta D'Adda (CR), Italy

[21] Appl. No.: 911,174

[22] Filed: Jul. 9, 1992

[30] Foreign Application Priority Data

Jul. 9, 1991 [DE] Fed. Rep. of Germany ....... 4122613

[51] Int. Cl.$^5$ .................................. F16L 35/00
[52] U.S. Cl. .................................. 285/26; 285/91; 285/137.1; 285/312; 285/85
[58] Field of Search ............. 285/26, 29, 82, 84, 285/85, 91, 311, 312, 137.1; 137/614.04

[56] References Cited

U.S. PATENT DOCUMENTS

| 949,608 | 2/1910 | Watt .................................. 285/312 |
| 1,481,392 | 1/1924 | Schawrow . |
| 1,793,015 | 2/1931 | Roos .................................. 285/311 |
| 2,333,423 | 11/1943 | Hufferd . |
| 2,482,292 | 9/1949 | Sabbia . |
| 3,124,374 | 3/1964 | Krapp .................................. 285/85 |
| 3,214,195 | 10/1965 | Zahuranec et al. . |
| 3,300,235 | 1/1967 | Blackwell .......................... 285/312 |
| 3,425,717 | 2/1969 | Bruce ............................ 285/312 X |
| 3,527,480 | 9/1970 | Larson . |
| 3,559,574 | 2/1971 | Gates . |
| 3,721,359 | 3/1973 | Howell et al. ................. 285/311 X |
| 4,408,521 | 10/1983 | Schelli et al. . |
| 4,615,546 | 10/1986 | Nash et al. . |
| 4,691,942 | 9/1967 | Ford .................................. 285/84 |

FOREIGN PATENT DOCUMENTS

| 3228434A1 | of 0000 | Fed. Rep. of Germany . |
| 3918250A1 | of 0000 | Fed. Rep. of Germany . |
| 2142690 | 3/1973 | Fed. Rep. of Germany ... 285/137.1 |
| 2909743 | 9/1980 | Fed. Rep. of Germany ... 285/137.1 |
| 2645242 | of 0000 | France . |
| 1411596 | 8/1965 | France .............................. 285/312 |

Primary Examiner—Dave W. Arola
Attorney, Agent, or Firm—Brooks & Kushman

[57] ABSTRACT

The quick-fitting coupling (1) has arranged thereon spring-loaded flat-face sealing couplings with interengaging male and female members (2,3) to serve as hydraulic couplings. The female member (2) of each flat-face sealing coupling is provided with an outwardly projecting peripheral flange (14) for precise embedded engagement with a respective peripheral groove on a mounting opening for the female member arranged on the fixed support plate (4), the arrangement being such that the flat end face (17) of the female member (2) comes to lie in a common plane with the coupling side (18) of the support plate (4) and is in abutting relationship therewith. Furthermore, the male members (3) are rigidly fastened to the movable support plate (5) and are projecting therefrom to a point so as to cause the two support plates (4,5), when the flat-face sealing couplings are in the coupled position, to be in abutting engagement with each other. This arrangement will render the quick-fitting coupling very compact and enable it to be coupled and uncoupled, even when under pressure, without leakage of hydraulic fluid. Due to the absolutely rigid mounting of the female members (2) as well as the male members (3) on the respective support plates (4,5), the interengaging coupling members of the flat-face sealing coupling are not subjected to any transverse forces during the coupling and uncoupling procedures and at the time when the coupling is in the coupled position. This feature is of particular advantage when using such quick-fitting couplings in the agricultural field and under relatively rugged conditions.

12 Claims, 5 Drawing Sheets

QUICK-FITTING COUPLING FOR SIMULTANEOUSLY CONNECTING OR DISCONNECTING A PLURALITY OF COUPLINGS

TECHNICAL FIELD

The invention relates to a quick-fitting coupling for simultaneously connecting or disconnecting a plurality of couplings and/or connectors, including interengaging coupling or plug and socket type connecting members of hydraulic, pneumatic and/or electric energy transmission devices, especially a coupling block for hydraulically operated front loaders mounted to vehicles, with the respective interengaging coupling and plug end socket type connecting members being positioned on two support plates adapted for movement towards one another by means of mutually interconnected clamping levers which engage the edges of the support plates from the outside, and with the support plates being fixed into position upon reaching the coupled position, and one of the support plates being fixedly mounted on the vehicle, and with the clamping levers being adapted for pivotal movement about coaxially positioned spindles on one of the two support plates and being provided with arcuate engagement slots adapted for engagement with coaxially oriented clamping studs projecting from oppositely positioned edges on the other support plate and extending parallel to the pivot pins (8,9). The quick-fitting coupling is adapted for simultaneously fitting together a plurality of quick-fitting unions of the type that are used especially for mounting front loaders or similar hydraulically operated implements to vehicles. The ability to simultaneously connect the hydraulic and pneumatic lines as well as the electric coupling members reduces the coupling time and eliminates the possibility to couple the wrong members of the various hydraulic, pneumatic or electric quick-fitting coupling devices together.

BACKGROUND ART

The French publication FR 26 45 242 discloses a multiple coupling device for hydraulic line connections and electric plug and socket type connections wherein the hydraulic coupling is in the form of a spring-loaded quick-fitting coupling of the ball-locking type. A lower pan-shaped plate with upwardly projecting plug members of the quick-fitting coupling is fixedly mounted on the tractor, while the sleeve members of the coupling connections are mounted on a housing which is engaging the lower pan-shaped plate from above in a cover-like fashion, and including clamping levers which are adapted for rotation about a common axis, said clamping levers being provided with arcuate slots for engagement with clamping studs which are laterally projecting from the lower plate and which are equipped with rollers.

The upper box-like housing has an upper fixed plate from which the sleeve members of the quick-fitting coupling project downwardly so as to extend through a second plate which is movable relative to the upper fixed plate and which is connected with the sliding bushings of the sleeve members for the ball locking mechanism. This second movable intermediate plate is mounted for reciprocating movement in vertical laterally arranged slots on the box-like housing, and is adapted, by way of arcuate tracks on the lateral clamping levers, for movement, upon each coupling and decoupling action, relative to the upper fixed plate in such a manner that the ball locking mechanisms of the sleeve members are engaging into corresponding peripheral keyways provided in the plug-in members or are being disengaged therefrom.

The disadvantage of this prior art multiple coupling is that, with each coupling and decoupling event, hydraulic fluid is escaping on the quick-fitting couplings which collects in the fixedly mounted pan-shaped lower member. Therefore, the multiple coupling cannot be mounted onto the vehicle in a position that varies from the lower dish-shaped plate. Furthermore, because of the additional movable plate needed for the operation of the ball locking mechanisms, the design of this coupling is relatively complex, and the sleeve members of the quick-fitting couplings cannot be mounted onto the cover-like upper portion with sufficient rigidity so as to ensure a reliable wear-resistant connection. For instance, flexible pipes or hoses containing pressurized fluid may cause displacement or misalignment between the plug members and the sleeve members of the couplings and may adversely affect the function of the same. Furthermore, a precise mutual positioning of the two movable plates of the multiple coupling must be assured by the lever system.

According to another prior art quick-fitting coupling for coupling members equipped with valves, which is disclosed in the German Publication DE-AS 12 56 006, each of the two clamping levers is provided with an arcuate track which terminates in a catch for receiving clamping studs that project from the oppositely positioned support plate. Furthermore, parallel oriented guide pins are extending from the lower support plate adjacent to the sleeve members of the valve couplings. The guide pins are adapted for engagement, with relatively little play, into corresponding recesses provided on the other support plate with the plug members. However, in this arrangement the sleeve members extend relatively high up from the lower support member, which makes this coupling rather bulky, and there is also the disadvantage that the hydraulic fluid leaking out after each coupling and decoupling operation is causing the coupling to be contaminated and therefore necessitates frequent cleaning which is relatively cumbersome.

German Publication DE 32 28 434 describes a coupling device for the energy supply to interchangeable working units of an injection molding machine which is equipped with so-called quick-locking couplings, with the coupling members being comprised of a pin bushing and a pin which is adapted for axial insertion therein. The locking means are in the form of locking balls which engage into a peripheral groove of the pin and which are retained in the engaged position by a locking sleeve which is axially movable against the bias of a spring. This locking sleeve must be separately actuated during each coupling and decoupling procedure. Furthermore, this prior art coupling device is not equipped with manually operable pivoting levers for putting the members into the coupled position. Instead, the coupling procedure for all couplings is done simultaneously by means of an unduly complicated piston and cylinder arrangement which is controlled, for instance, hydraulically and automatically from a control desk, so that the coupling procedure is taking place fully automatically without any additional manual manipulation.

Another multiple coupling with a plurality of self-sealing interlocking coupling members has been disclosed in German Publication DE- 39 18 250 A1. In this coupling device, either all plug-in members and/or all bushing members are being retained, respectively, in a mounting plate adjacent to the connecting housing with a relatively large lateral play transversely to the axial centerline of respective coupling, and allowance is made for some limited sliding movement. However, this lateral play during the coupling procedure causes difficulties when the respective plug-in and bushing members are connected with flexible pipes or hoses, as was already pointed out earlier in connection with the French Publication FR 26 45 242.

SUMMARY OF THE INVENTION

It is the object of the present invention to provide a quick-fitting coupling for simultaneously connecting or disconnecting a plurality of couplings and/or plug-in devices comprised of interengaging plug-in or coupling members in accordance with the over-all concept of claim 1 which is rugged and compact in design, and to incorporate features in a coupling of this type which enable to manually connect the coupling in a simple manner and with the use of simple mechanical devices, and wherein the risk of misalignment and displacement between the respective male and female members as well as the problem of hydraulic fluid loss is being eliminated.

This objective is accomplished in accordance with the invention in that the hydraulic couplings are in the form of spring-loaded flat-face sealing couplings wherein the male and female members are interengaging without the use of ball-type locking mechanisms, in that the female member of each flat-face sealing member is provided with an outwardly projecting peripheral flange for engagement with a respective peripheral groove on a mounting opening for the female member on the fixedly mounted support plate, the arrangement being such that its flat end face is sealingly engaging the coupling side of the support plate in a common plane, and in that the male members of the flat-face sealing coupling are rigidly secured onto the movable support plate and are projecting far enough out of that support plate so as to ensure that the two support plates are retained in tight abutment when in the coupled position.

The advantage of the quick-fitting coupling according to the present invention is that, because of the absolutely rigid mounting of the female as well as the male coupling members on the respective support plates by means of the clamping levers that are articulated thereto, the hydraulic couplings which, instead of being of the ball-locking type, are in the form of spring-biased flat-face sealing couplings and which enable coupling and uncoupling to proceed without the escape of hydraulic fluid, can be fitted to and separated from one another in a simple manner without causing any misalignment or displacement of the respective coupling members to occur even in the presence of a relatively high pressure in the hydraulic system or a residual pressure that is present in the implement or that has been built up from the outside due to heat radiation. This is also accomplished by virtue of the very rigid and precisely seated female members on the rigidly secured support plate and, furthermore, due to the fact that the support plates, because of the particular arrangement of the male members, are retained in a tightly fitting face-to-face relationship when the flat-face sealing couplings are in the coupled position, so that even in the coupled position the interengaging coupling members of the flat-face sealing coupling are not subjected to any unwanted transverse forces. This particular arrangement of the female coupling members on the fixedly mounted support plate enables the support plate to be kept free from dust and other contamination on the coupling side and to be cleaned in a particular simple manner, which is a very advantageous feature, especially when such quick-fitting couplings are being used in conjunction with agricultural work.

The objective of providing a sturdy and compact construction is also being achieved in that the clamping levers are articulated onto the rigidly mounted support plate, by way of their pivot pins, closely below the coupling side of the support plate so that both coupling halves are being forced onto one another when in the coupled position.

Another feature contributing to the compact construction and a trouble-free and leak-free functioning of the quick-fitting coupling is the fact that the two support plates have a circular configuration, that the lower rigidly mounted support plate has a somewhat smaller diameter than the movable upper support plate, and that the lower support plate is, on its periphery in the region of the two clamping levers articulated thereto, flattened in such a manner that the clamping levers are able to receive the clamping pins, which are laterally projecting from the movable support plate, in their arcuate engagement slots within the circular periphery of the fixed support plate.

Another advantageous arrangement is one wherein on both support plates the male and female coupling members of, preferably, four flat-face sealing couplings are spaced apart in regular angular intervals of 90° about a center opening for an additional flat-face sealing coupling or an electrical or pneumatic plug-in type connector and are arranged in pairs on both sides of the pivoting axis of the clamping levers and the clamping pins extending parallel thereto, the arrangement being such that during the coupling and uncoupling procedure all spring-loaded flat-face sealing couplings are always being uniformly pressed together and are released again.

The coupling and uncoupling procedure of the quick-fitting coupling can also be improved in that at least two guide pins are extending in parallel relationship to one another from the support plate with the female members of the flat-face sealing coupling in a direction coaxially to the longitudinal axes of the flat-face sealing coupling at both sides of the pivoting axis of the clamping levers and midway therebetween, and with the guide pins being adapted for sliding play engagement into correspondingly fitting guide apertures arranged on the support plate provided with the male coupling members of the flat-face sealing coupling.

Preferably, the male members of the flat-face sealing coupling are provided with an outwardly extending circumferential flange for engagement into a correspondingly shaped circumferential groove on the mounting opening of the associated support plate and are retained therein by means of a threaded sleeve which is threadedly secured onto the coupling end of the male member from the back side of the support plate.

To combat accumulation of dirt on the quick-fitting coupling, the invention proposes that the support plates be fitted around the edges with a seal which extends around the interengaging male and female coupling members of the flat-face sealing couplings, with an annular cord packing preferably provided on one of the support plates as a sealing means which, when the support plates are in engagement with one another, sealingly engages the opposite support plate. To effect a particularly effective sealing arrangement between the two support plates, the invention proposes that the movable support plate be fitted with a projecting flat center portion which is surrounded by a step-like recessed circumferential edge portion, and that the flat center portion be adapted for sealing engagement into a correspondingly shaped depression with a circumferential flange provided on the circumferential flange provided on the fixed support plate.

In order to fix the support plates in position relative to the interengaging flat-face sealing couplings while in the coupled position, each clamping lever is provided at the end of the arcuate engagement slot with a catch which serves to lockingly engage, through the force of the spring-biased flat-face sealing coupling, the clamping pins projecting from the movable support plate when the coupling is in the engaged position.

Furthermore, in order to prevent unwanted disengagement of the quick-fitting coupling, the invention proposes that at least one of the two clamping levers be fitted with a spring-biased locking pin which extends parallel to the pivoting axis of the clamping lever so that when the flat-face sealing coupling is in the engaged position the clamping lever is being fixedly retained on the associated support plate.

BRIEF DESCRIPTION OF THE DRAWINGS

One preferable embodiment is schematically illustrated in the drawing, wherein.

DESCRIPTION OF THE PREFERRED EMBODIMENT

Figures 5, 7:
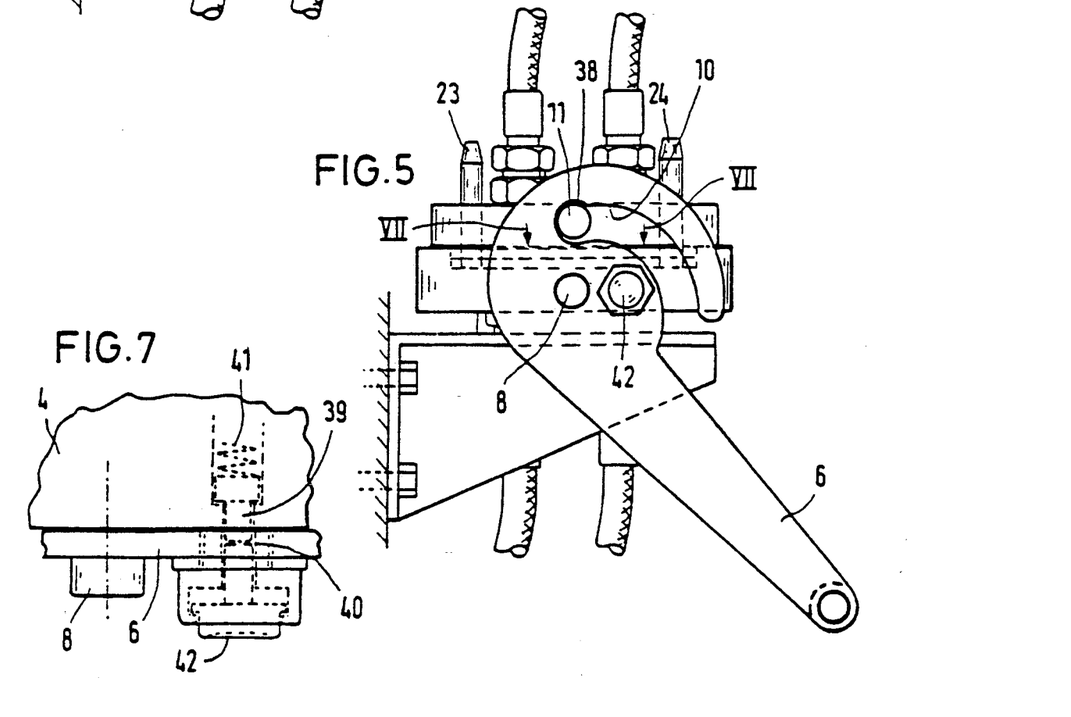
FIG. 5 is a side view after completion of the coupling procedure.
FIG. 7 is another enlarged partial illustration of an additional catch member for the clamping levers of the quick-fitting coupling along the cross-sectional line VII—VII in FIG. 5.

In the quick-fitting coupling according to the invention, the interengaging female and male members 2,3 of an otherwise conventional spring-biased flat-face sealing coupling 1 are seated, without the provision of a ball-type locking mechanism, on two support plates 4,5 adapted for movement towards one another by means of interlinked clamping levers 6,7 which are engaging the support plates 4,5 from the outside at the edges thereof, and adapted for engagement in face-to-face relationship when in the coupled position, as illustrated in FIG. 5. The clamping levers 6,7 are adapted for cooperative pivoting movement on one of the support plates 4,5, more particularly the support plate 4, about coaxially disposed pivoting pins 8,9 and are provided with arcuate engagement slots 10 that enable the clamping levers 6,7 to engage, from oppositely disposed edges on the other support plate 5, clamping pins 11,12 which are projecting from said support plate 5 and oriented coaxially relative to each other and parallel to the pivot pins 8.

Figures 1, 2, 3:
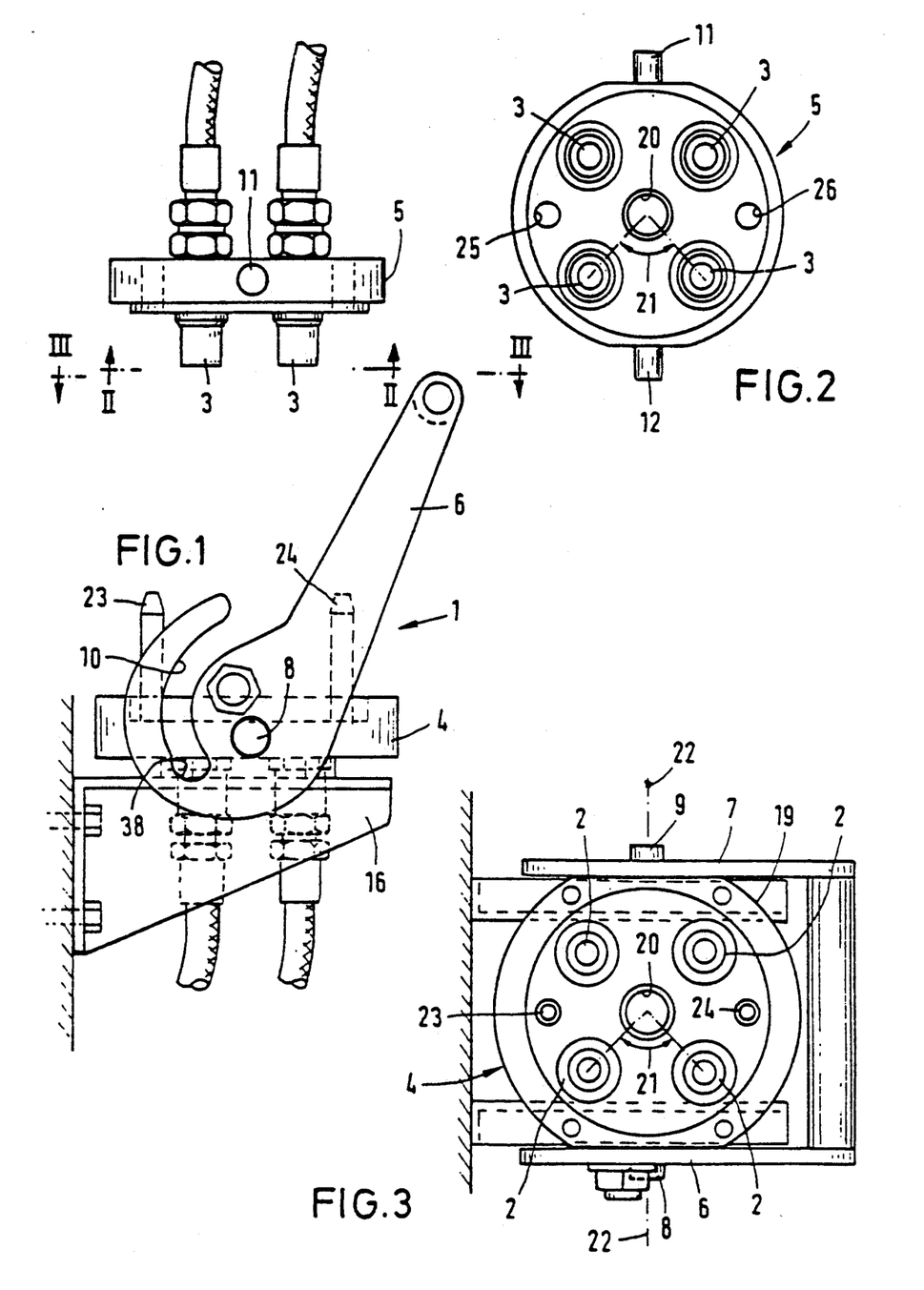
FIG. 1 is a side elevation of a quick-fitting coupling with the coupling members being spread apart from one another.
FIG. 2 is a bottom view of the male member of the quick-fitting coupling as viewed in the direction of arrows II—II in FIG. 1.
FIG. 3 is a top view of the female member of the quick-fitting coupling as viewed in the direction of arrows III—III in FIG. 1.

The female member 2 of each flat-face sealing coupling has, adjacent to a threaded portion 13 (FIGS. 8 to 10), an outwardly projecting peripheral flange 14 for engaging the female member 2 in a depressed, precisely fitting position into a corresponding peripheral groove 5 on a mounting opening for the female member 2 on the associated support plate 4 which is fixedly mounted on a bracket 16 (FIGS. 1, 4 and 5) provided on a vehicle or the like, the arrangement being such that the flat end face of the female member 2 engages the coupling side 18 of the support plate 4 and forms a common plane therewith.

The clamping levers 6,7 are articulated, by means of their pivot pins 8,9, onto the fixedly mounted support plate 4 at a location closely below the coupling side 18 of the support plate 4.

Figure 10:
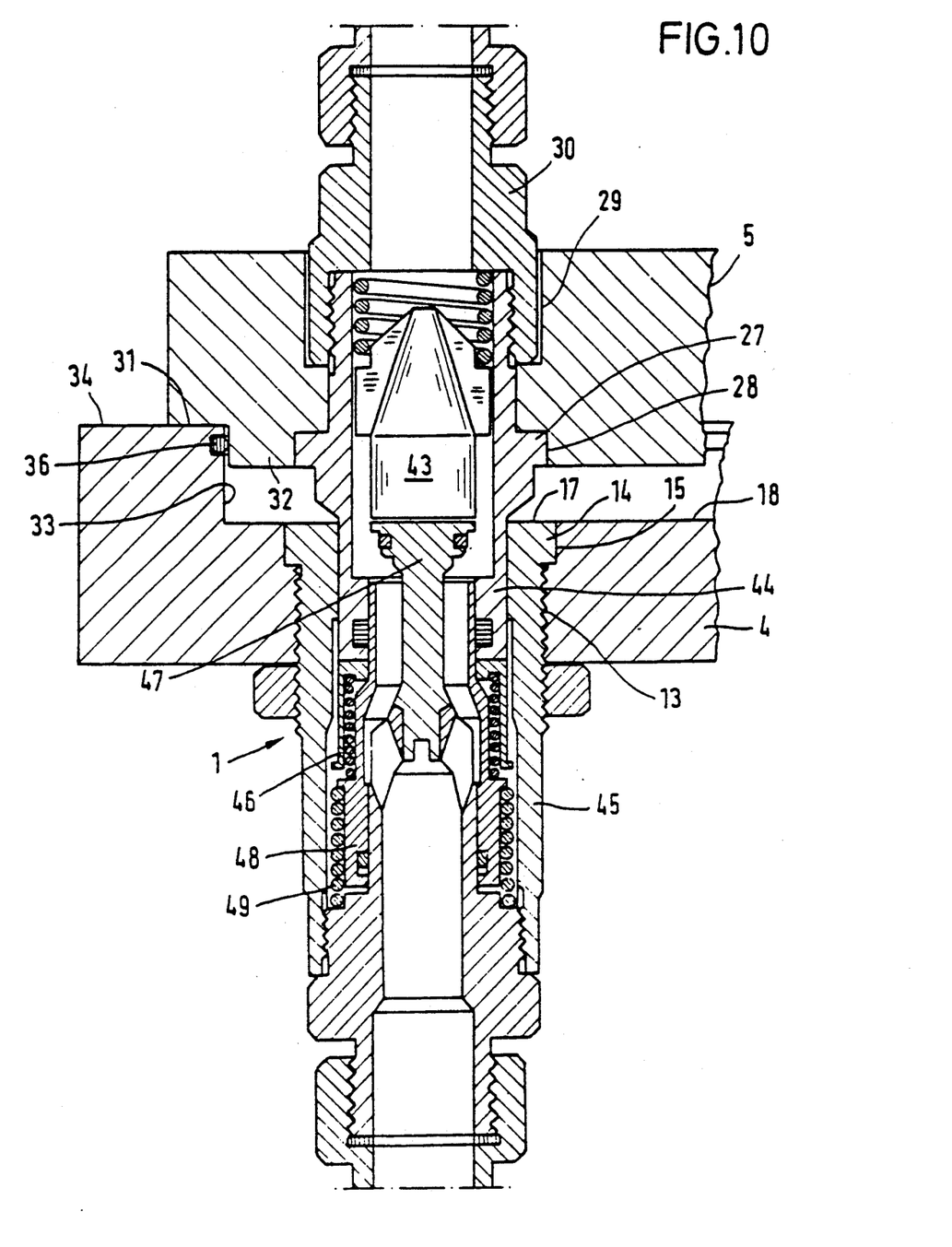
FIG. 10 is an enlarged longitudinal section through the quick-fitting coupling after attaining the coupled position as illustrated in FIG. 5.

The male members 3 of the flat-face sealing coupling are projecting out of the movable support plate 5 far enough to enable the two support plates 4,5 to be in tight engagement with one another when the flat-face sealing coupling is in the coupled position, as illustrated in FIGS. 5 and 10.

Both support plates 4,5 (FIGS. 2 and 3) are of circular configuration, with the lower support plate, which is fixedly mounted to the vehicle, having a somewhat larger diameter than the movable upper support plate 5, and being laterally flattened on its circular peripheral surface 19 in the region of the two clamping levers 6,7 articulated thereto (FIG. 3), the arrangement being such that the clamping levers 6,7 are able to receive in their arcuate engagement slots 10 the two clamping pins 11,12 extending laterally from the movable support plate 5 while still being inside the circular periphery 19 of the fixed support plate 4.

On both support plates 4,5 the male and female coupling members 2,3 of four flat-face sealing couplings 1 are spaced apart in regular angular intervals 21 of 90° about a center opening 20, which may serve to accommodate an additional flat-face sealing coupling or an electrical or pneumatic plug-in type connector, and are arranged in pairs on both sides of the pivoting axis 22 of the clamping levers 6,7 and the clamping pins 11,12 extending axially parallel thereto, the arrangement being such that during the coupling or uncoupling procedure all spring-loaded flat-face sealing couplings are always being uniformly pressed together and released again.

Furthermore, two parallel extending guide pins 23,24 are projecting from the support plate 4 provided with the female members 2 of the flat-face sealing coupling 1 and are oriented coaxially with the longitudinal axes of the flat-face sealing couplings, and the guide pins 23,24 are arranged at both sides of the pivot axes 22 of the clamping levers 6,7 and midway therebetween, with the guide pins 23,24 being adapted for sliding play engagement into correspondingly shaped guide openings 25,26 on the other support plate 5 accommodating the male members 3 of the flat-face sealing couplings.

The male members 3 of the flat-face sealing couplings 1 are also provided with an outwardly projecting peripheral flange 27 which serves for precisely fitting the male members into a correspondingly shaped peripheral groove 28 on the mounting opening 29 of the associated support plate 5 wherein the male members are retained in position by means of a threaded sleeve 30 which is threadedly fastened from the back side of the support plate 5 to the connecting end of the male member 3.

In order to provide that the support plates 4,5 are being sealed off against each other in the coupled position illustrated in FIGS. 5 and 10, the movable upper support plate 5 is provided with a projecting flat mid-portion 32 which is surrounded by a step-like recessed peripheral edge 31. The mid-portion 32 is adapted for sealing engagement with the fixed support plate (4) provided with a correspondingly shaped flat depressed portion 33 with a projecting peripheral edge 34. The fixedly mounted lower support plate 4 is provided for this purpose with an annular cord packing 36 inserted into a continuous circumferentially extending groove 35, with the cord packing being in sealing engagement with the upper support plate 5 on the outer periphery 37 of the flat mid-portion 32 when the mechanism is in the coupled position as illustrated in FIGS. 5 and 10.

Figures 4, 6:
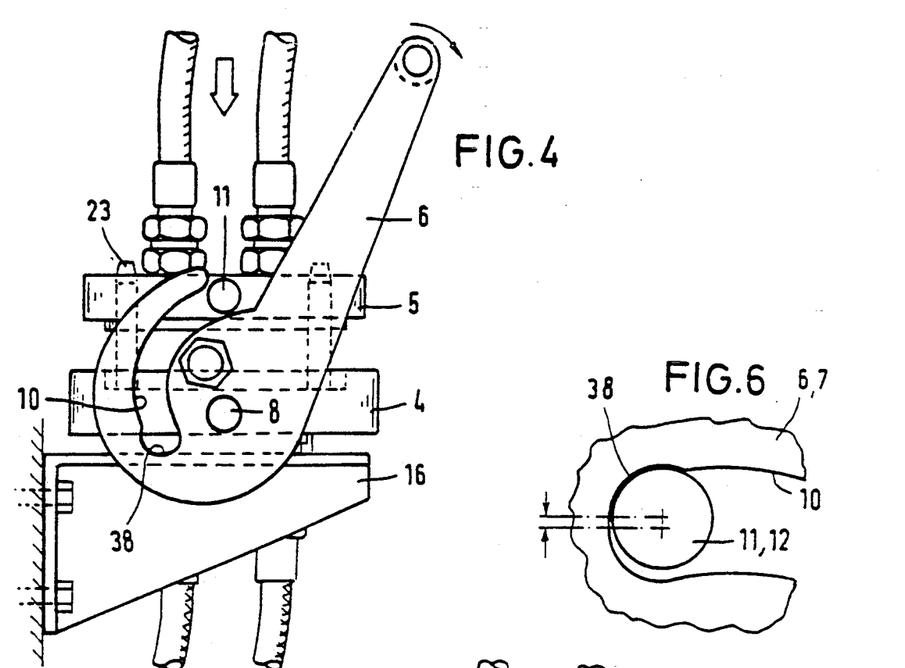
FIG. 4 is a side view of the quick-fitting coupling during the coupling procedure.
FIG. 6 is an enlarged partial illustration of a catch member on the two clamping levers of the quick-fitting coupling in the coupled position.

In order to fix the support plates 4,5 in position relative to the interengaging flat-face sealing couplings 1 when the device is in the coupled position according to FIGS. 5 and 10, each clamping lever 6,7 is provided at the ends of the arcuate engagement slots 10 with a catch 38 which, as illustrated in FIG. 6, are dimensioned so that clamping pins 11,12 extending laterally from the movable support plate 5, upon arriving at the locking position according to FIGS. 5 and 6, are caused by the force of the spring-loaded flat-face sealing couplings, to lockingly engage into the recesses and are thereby locked into the coupling position.

Furthermore, one of the two clamping levers 6,7 is provided with a spring-loaded locking pin 39 (FIG. 7) arranged parallel to the pivot axis 22 which is designed to fix the clamping levers 6,7 on the associated support plate 4 in position when the mechanism is in the coupled position.

The locking pin 39 is arranged on the fixedly mounted support plate 4 which carries the female members 2 of the flat-face sealing couplings and, when the flat-face sealing couplings are in the coupled position as illustrated in detail in FIG. 6, is moved into engagement from the inside with a coaxial bore 40 arranged on the adjacent clamping lever 6. To disengage the locking pin 39 from this locking position, a push button 42 is provided on the outer side of the clamping lever 6 which is adapted for sliding movement in opposition to the locking pin 39 which is biased by the force of a compression spring.

Figure 8:
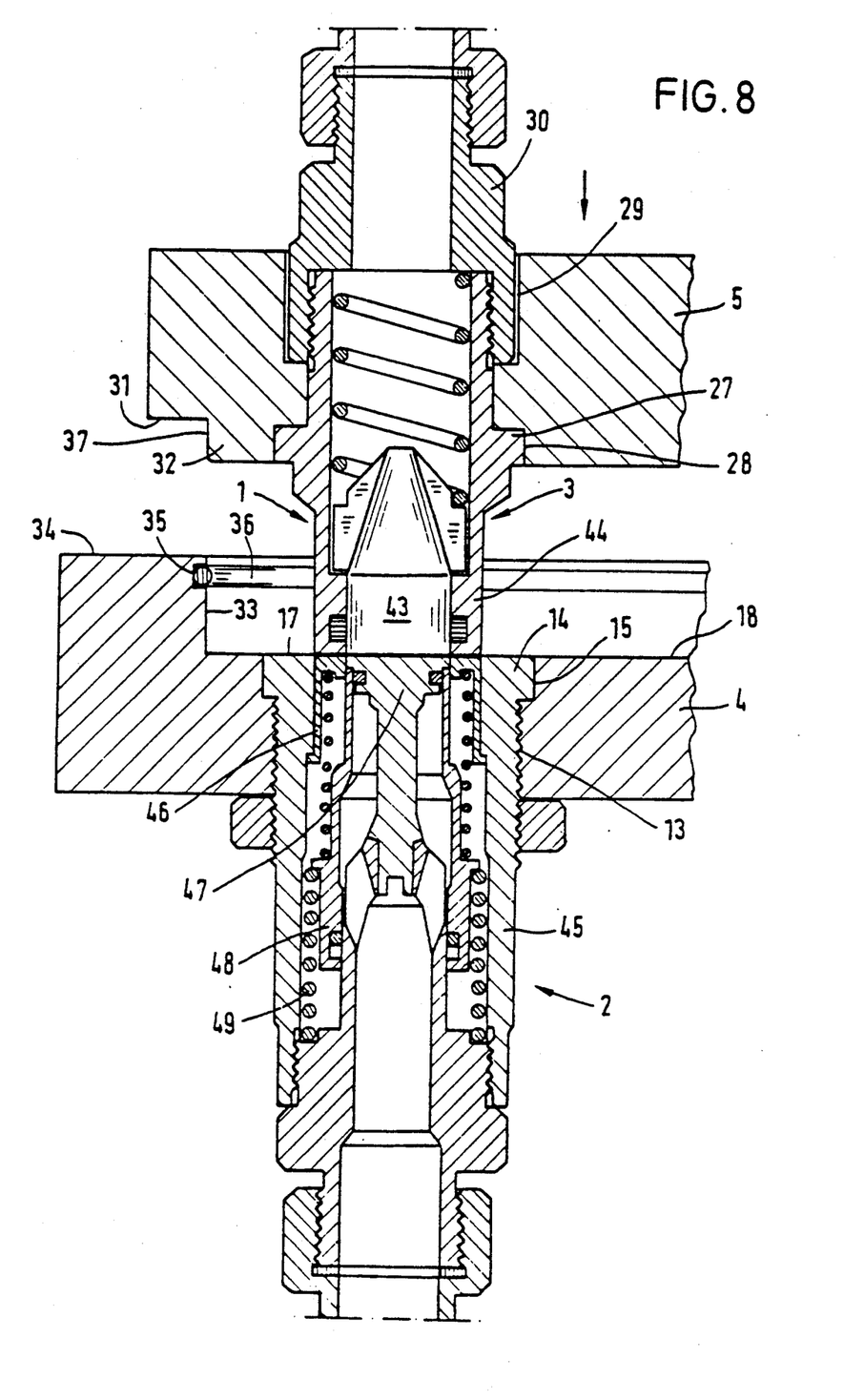
FIG. 8 is an enlarged longitudinal section through the quick-fitting coupling at the beginning of the coupling procedure in the position of FIG. 4.
Figure 9:
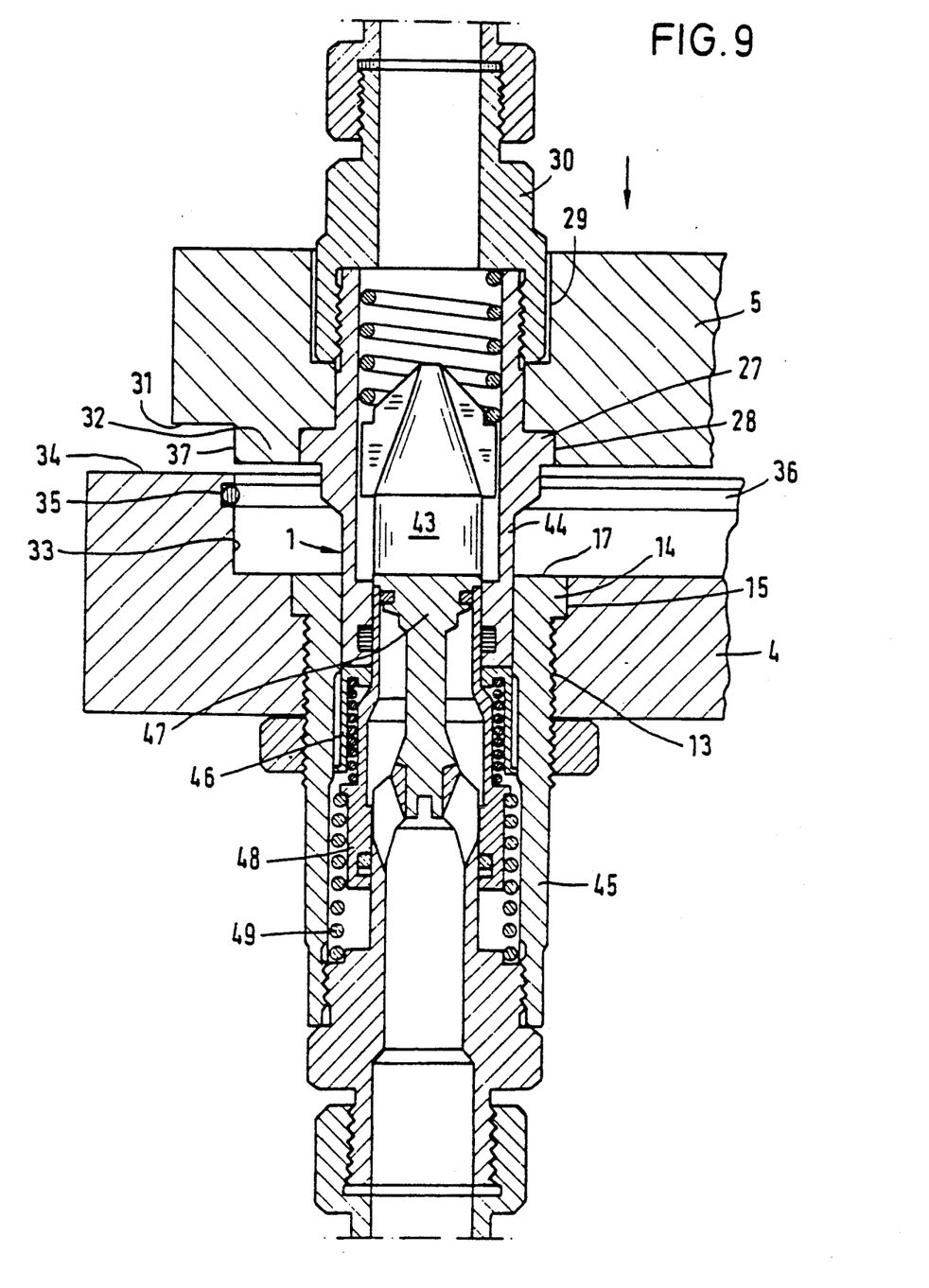
FIG. 9 is an enlarged longitudinal section through the quick-fitting coupling in an intermediate position during the coupling procedure.

The operation of the quick-fitting coupling with the coupling members of the flat-face sealing coupling which are rigidly mounted on the two support plates 4,5 is illustrated in detail in FIGS. 8 to 10. When initiating the coupling procedure, the plug members 3 of the flat-face sealing coupling which are retained in a closed position by means of a spring-loaded valve body 43, are first engaging the sleeve members 2 on the lower support plate 4, which are also still in the closed position. Upon exerting more downward pressure on the upper support plate 5 to which the plug members 3 of the flat-face sealing couplings 1 are attached by means of the clamping levers 6,7, the tubular valve housing 44 of the plug member 3 is caused to move telescopically into the valve housing 45 of the sleeve member 2, which is also of tubular configuration and thereby initially forces a spring-loaded intermediate sleeve 46 rearwardly until this intermediate sleeve moves an inner sleeve 48 surrounding the rigid valve body 47 of the sleeve member 2 against the force of a propped up spring 49, which causes, upon further downward pressure of the plug members 2, the valve body 43 of the plug member 3 to be lifted up from its seat and, subsequently, the inner sleeve 48 surrounding the valve body 47 of the sleeve member 2 to open the passage of the sleeve member 2 to the plug member 31 of the respective flat-face sealing couplings 1 without any leakage of hydraulic fluid.

After the coupling position illustrated in FIGS. 5 and 10 has been reached, the movable support plate 5, together with its projecting mid-portion, has advanced into the depression 33 of the fixed support plate 4 to a point that its stepped peripheral edge 31 is abutting the upper peripheral edge 34 of the lower support plate 4, and the two support plates 4,5 are sealed off from one another by the continuous cord packing 36. The clamping pins 11,12 of the support plate 5 drop into the catch members 38 provided on the two clamping levers 6,7, as illustrated in FIGS. 5 and 6, and lock the coupling, together with the locking pin 39 which has also been moved to its locking position, into position.

Upon releasing the coupling after freeing the locking pin 39 by opening the clamping lever 6,7, the sequence of steps is reversed from the position illustrated in FIGS. 5 and 10 through the intermediate position of FIG. 9 and to the position shown in FIG. 4 in which the coupling members of the flat-face sealing couplings 1 are closed again so that the upper support plate 5 and the plug members 3 attached thereto can be raised up from the sleeve members 2 of the flat-face couplings 1 without any loss of hydraulic fluid, or the risk of air entering into the hydraulic system.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:
1. A quick-fitting coupling comprising:
respective interengaging coupling and socket type connectors (2,3) positioned on two support plates (4,5) movable towards one another by mutually interconnected clamping levers (6,7) engaging the edges of the support plates, the support plates being fixed into position upon reaching a coupled position, one of the support plates (4) being fixedly mounted and having a coupling side (18);
the clamping levers (6,7) being pivotably movable about coaxially oriented spindles on one of the two support plates (4,5) and being provided with arcuate engagement slots (10) designed for engaging coaxially oriented clamping pins (11,12) projecting from oppositely positioned edges on the other support plate and extending parallel to pivot pins (8,9); flat-face sealing couplings (1) having female and male members (2,3) provided respectively on the two support plates;

the female members (2) of each flat-face sealing coupling being provided with a projecting peripheral flange (14) designed to engage with a correspondingly shaped peripheral groove (15) on a mounting opening for the female member (2) and being secured to the fixed support plate (4) in such a manner that its flat end face is on the coupling side (18) of the support plate (4) and forms a common plane therewith;

the male members (3) of the flat-face sealing couplings being rigidly secured to the movable support plate (5) and extending therefrom to a point so as to enable the two support plates (4,5) to be placed in abutting relationship when the flat-face sealing couplings are in the coupled position.

2. The quick-fitting coupling according to claim 1, wherein the clamping levers (6,7) are articulated, by way of their pivot pins (8,9) to the fixed support plate at a place closely below the coupling side (18) of the support plate (4).

3. The quick-fitting coupling according to claim 1, wherein the two support plates (4,5) have a circular configuration, the movable support plate (5) having said clamping pine (11, 12) projecting laterally therefrom, the lower fixed support plate having a somewhat larger diameter than the upper movable support plate (5) and being provided on its periphery (19) in the region of the two clamping levers (6,7) articulated thereto with a flattened portion so as to enable the clamping levers (6,7) to receive the clamping pins in the arcuate engagement slots (10) provided thereon.

4. The quick-fitting coupling according to claim 3, wherein the clamping levers (6,7) are each provided at the ends of the arcuate engagement slots (10) with a catch (38) for fixing the support plates (4,5) relative to the interengaging flat-face couplings, each catch providing locking engagement in the coupled position for the clamping pins (11,12) projecting from the movable support plate (5).

5. The quick-fitting coupling according to claim 3, wherein on both support plates (4,5) the male and female coupling members (2,3) are arranged about a center opening (20) serving to accomodate additional flat-face sealing couplings, and said additional couplings are arranged in pairs on both sides of a pivoting axis (22) of the clamping levers (6,7) and the clamping pins (11,12) and extend axially parallel to said male and female coupling members, the arrangement being such that during the coupling or uncoupling procedure all flat-face sealing couplings are always being uniformly pressed together and released again.

6. The quick-fitting coupling according to claim 5, wherein at least two parallel extending guide pins (23,24) project from the support plate (4) provided with the female members (2) of the flat-face sealing couplings and are oriented coaxially with the longitudinal axes of the flat-face sealing couplings, the guide pins (23,24) being arranged at both sides of the pivot axes (22) of the clamping levers (6,7) and midway therebetween, the guide pins (23,24) being adapted for sliding play engagement into correspondingly shaped guide openings (25,26) arranged on the other support plate (5) provided with the male members (3) of the flat-face sealing couplings.

7. The quick-fitting coupling according to claim 1, wherein the male members (3) of the flat-face sealing couplings are provided with a projecting peripheral flange (27) which serves for the engagement of the male members (3) into a correspondingly shaped peripheral groove (28) on a mounting opening (29) on the associated support plate (3) wherein the male members (3) are retained in position by means of a threaded sleeve (30) which is threadedly fastened from the support plate (5) to the connecting end of the male member (3).

8. The quick-fitting coupling according to claim 1, wherein the support plates (4,5) are provided with a sealing member at the edges which extends around the interengaging male and female members (2,3) of the flat face sealing couplings.

9. The quick-fitting coupling according to claim 1, wherein one of the support plates (4) has an annular cord-type seal (36) arranged thereon which, when the support plates (4,5) are joined to each other, is in sealing engagement with the other support plate (5).

10. The quick-fitting coupling according to claim 1, wherein the movable support plate (5) is provided with a flat projecting flat mid-portion (32) which is surrounded by a step-like recessed peripheral edge (31), the mid-portion (32) being adapted for sealing engagement with the fixed support plate (4) provided with a correspondingly shaped flat depression (33) having a projecting peripheral edge (34).

11. The quick-fitting coupling according to claim 1, wherein at least one of the two clamping levers (6,7) is provided with a locking pin means (39) which extends parallel to a pivoting axis (22) thereof and is adapted to fix the clamping levers (6,7) in position on the associated support plate (4) when the flat-face sealing couplings are in the coupled position.

12. The quick-fitting coupling according to claim 11, wherein the locking pin means (39) is arranged on the support plate (4) with the female members (2) of the flat-face sealing couplings and, when the flat-face are in the coupled position, is moved into engagement from the inside with a bore (40) oriented coaxially thereto on the associated clamping lever (6), the outer side of the respective clamping lever (6) having a push button (42) adapted for sliding movement against the locking pin means (39) for releasing the locking pin means from the locking position.

* * * * *